United States Patent [19]
Herzig

[11] 3,710,225
[45] Jan. 9, 1973

[54] BATTERY OPERATING SYSTEM TIMED BY COULOMETERS

[75] Inventor: Robert W. Herzig, North Adams, Mass.

[73] Assignee: Sprague Electric Company, North Adams, Mass.

[22] Filed: March 20, 1972

[21] Appl. No.: 235,998

[52] U.S. Cl. ..................... 320/9, 320/14, 320/40, 320/45
[51] Int. Cl. .................................................. H02j 7/00
[58] Field of Search ............ 320/5, 23, 44, 45, 14, 43, 320/9, 39, 40

[56] References Cited

UNITED STATES PATENTS

| | | | |
|---|---|---|---|
| 3,417,307 | 12/1968 | Kosa et al. | 320/23 X |
| 3,421,067 | 1/1969 | Wilson et al. | 320/14 |
| 3,422,337 | 1/1969 | Carson | 320/14 |

*Primary Examiner*—J. D. Miller
*Assistant Examiner*—Robert J. Hickey
*Attorney*—Arthur G. Connolly et al.

[57] ABSTRACT

A battery circuit having a drain coulometer and a charge coulometer connected in series so as to alternately plate and deplate and being alternately connectible in parallel with one of a pair of current sensing resistors in series with the battery, each of which accurately reflects the current condition of the battery circuit over a period of time. The drain coulometer integrates a proportional charge current.

Thus during the drain mode of the battery, when a predetermined amount will be removed from the drain coulometer and deposited in the charge coulometer. At a critical depletion of coulombs the drain monitor undergoes an impedance transformation which triggers a gate mechanism to actuate switching of the battery to the charge mode.

In the charge mode the charge coulometer undergoes the critical coulomb depletion leading to an impedance transformation which in turn triggers a further gate mechanism for actuating switching of the battery back to the drain mode.

7 Claims, 2 Drawing Figures

PATENTED JAN 9 1973 3,710,225

BATTERY OPERATING SYSTEM TIMED BY COULOMETERS

BACKGROUND OF THE INVENTION

This invention relates to circuitry for rechargeable batteries and containing a pair of coulometers one of which is plated while the other is deplated during the alternate discharge and recharge of the battery.

Rechargeable batteries are useful for providing load current over a period of time and then being reused after recharging by the application of a suitable charger voltage. Such recharging of the battery must be controlled to avoid a damaging overcharge. Also it is desirable to discontinue the use of a battery and disconnect it from the load when there has been a critical depletion of coulombs, which can occur before the battery exhibits a significant voltage decrease.

Further it is desirable to be able to automatically switch a rechargeable battery from a drain mode after a certain ampere-hour depletion to a charge mode and then when suitably recharged, but not overcharged, switch the battery back to a drain mode. It is particularly desirable to accurately determine the critical point of coulomb depletion and to be able to return to a discharged battery that amount of coulombs which have been taken from the battery during the drain mode.

One of the problems encountered in battery usage is the sensitivity of nickel-cadmium batteries to overcharging. Also in apparatus for automatically switching a battery into and out of recharged mode, variations in load current and variations in the charger voltage present a problem in the calculation of the amount of ampere hours of charging to be monitored by the monitoring device. A simple means for accomplishing the calculation and switching is desirable, and without robbing energy from the battery.

SUMMARY OF THE INVENTION

It is an object of this invention to provide a means for monitoring ampere-hour depletion from a battery and switching to a charge mode.

It is another object of this invention to provide a means which can integrate both a proportional charge current removed from a battery and a proportional charge current returned to the battery so that when a predetermined amount of charge has been drained from a rechargeable battery this will be reflected in a monitoring device and then means provides an equal amount of charge be returned to the battery during the recharge mode under the control of the monitoring device.

Still another object is that additional charge be returned, if so desired, with means for adjusting the voltage charge during the recharge mode to compensate for an efficiency loss in the operation of the system.

The coulometers of this invention in the battery control use a current through the cell proportional to the load or charging current of the battery so that the cell charge is proportional to the desired ampere-hour use of the battery. The drain coulometer is deplated by a current proportional to the battery drain. The coulometer voltage rise occurs when the number of coulombs taken from the battery reaches an established critical level. The voltage rise triggers the desired switch actuation activating the battery charger. The charged current discharges the charged coulometer and recharges the drain coulometer. When the charger has supplied the correct number of coulombs to the battery the voltage rise occuring on the charged coulometer actuates the mechanism for returning the battery to the drain condition.

The coulometers are connected in parallel alternately with one of two battery current sensing resistors. By arranging current sensing resistors with equal resistance the number of coulombs supplied by the battery charger will equal the number of coulombs supplied to the load by the battery. If the battery is less than 100 percent efficient the sensing resistor for the charge mode may be selected to be more charged into the battery than the load removes.

DESCRIPTION OF THE INVENTION

This invention employs two coulometers connected in a circuit with a rechargeable battery so that one coulometer deplates during the drain mode of the battery while the other deplates during the drain mode. Conversely the first coulometer deplates during the charge mode. Each coulometer is deplated by a current that is proportional to the battery drain current. Each coulometer undergoes a resistance rise at some interval of time in the deplating operation. This resistance rise results in an impedance transformation which in turn brings a change in potential on a first control rectifier through a concomitant voltage rise. This changed potential directly across the control rectifier applies to the control rectifier a voltage sufficient to cause conduction of current through the rectifier. A resistor connected in series with the control rectifier conducts current and a voltage is developed across this resistor, which voltage is applied to the gate of a second control rectifier connected to the resistor. The voltage rise in the resistor applied to the gate of the second control rectifier causes current conduction through the second rectifier and this current actuates switching means. The switching means are arranged to cause the discharged battery to be disconnected from the load and to apply a charging voltage to the battery.

In the battery-load circuit, the current value in any part of the circuit is the same as the current, but the current depends on the amount of resistance as well as the voltage. If the resistance in the battery-load circuit changes, the current value changes proportionally. In each coulometer, used as a timing cell the current through the cell is proportional to the load or charging current of the battery and the cell ampere-hour charge is proportional to the desired ampere-hour use of the battery. The following is illustrative

| Timing cell charge (proportional to battery charge) | = the integral time of | times the proportionality factor | times timing cell current (proportional to battery current) |
|---|---|---|---|

The two parallel branches placed on the battery divide the current so that part flows through the sensing resistor and part through the coulometer. The current in one part changes with the current in the other part.

Therefore the flow of current through the sensing resistor and through the coulometers is always divided into the same ratio of one to the other. As a result when the current through the sensing resistor changes the current through the coulometers undergoes the same change but only in its proportion of the total current determined by the above-mentioned ratio between the sensing resistor and the coulometers.

By sensing a voltage drop across the sensing resistor which is proportional to the load there is produced a proportional current through the coulometers, with consequent plating and deplating, and with consequent triggering action. Thus the load can vary and the charge current can vary with the total coulombs not being varied. It is possible to keep track of and identify the total coulombs in the coulometers and this is proportional to the coulombs in and out of the battery.

The battery is rated on an ampere-hour basis and the recharge should occur after a certain ampere-hour depletion. Thus the ampere-hour charge is a current times time product.

While the battery is charging after the switching operation the plating and deplating of the coulometers is reversed as the coulometers are so connected as to cause the deplated coulometer to be replated while the previously plated coulometer is deplated. This is effected by a proportional amount of charge being removed from the second coulometer and deposited in the first coulometer. The deplating and replating in the charge mode is the same as in the drain mode with the roles of the respective coulometers reversed and it continues until the second coulometer is deplated to a predetermined time interval at which a resistance rise within the coulometer causes an impedance transformation which translated to a suitable third control rectifier produces a voltage rise leading to conduction of current through the third control rectifier and a series connected resistor and then to apply a voltage to the gate of a fourth control rectifier which energizes means for switching switches which break the anode circuits of the second and fourth control rectifiers. The deenergization results in the switches being returned to the normal position for the drain mode disconnecting the battery and reconnecting the load to the battery and thus reinstituting the cycle. All of the control rectifiers are also returned to the blocking condition.

A sensing resistor in series in the battery circuit is provided for each of the modes, drain and charge. The sensing resistors are in parallel with the coulometers. The sensing resistors are subjected to voltage change in the discharge and recharge of the battery, and this voltage change is a factor in determining the resistor which controls the current through the coulometer during the two modes of operation. Thus the relationship between the amount of voltage change on the resistor and the maximum desirable current to be passed through the coulometer are the factors which determine the characteristics of the coulometers which are required in order to achieve the accurate balancing of the number of coulombs supplied by the battery charger to the battery with the number of coulombs supplied to the load by the battery.

The invention will be more clearly understood upon consideration of the following description taken together with the accompanying drawings.

DESCRIPTION OF THE PREFERRED EMBODIMENT

Figures 1, 2:
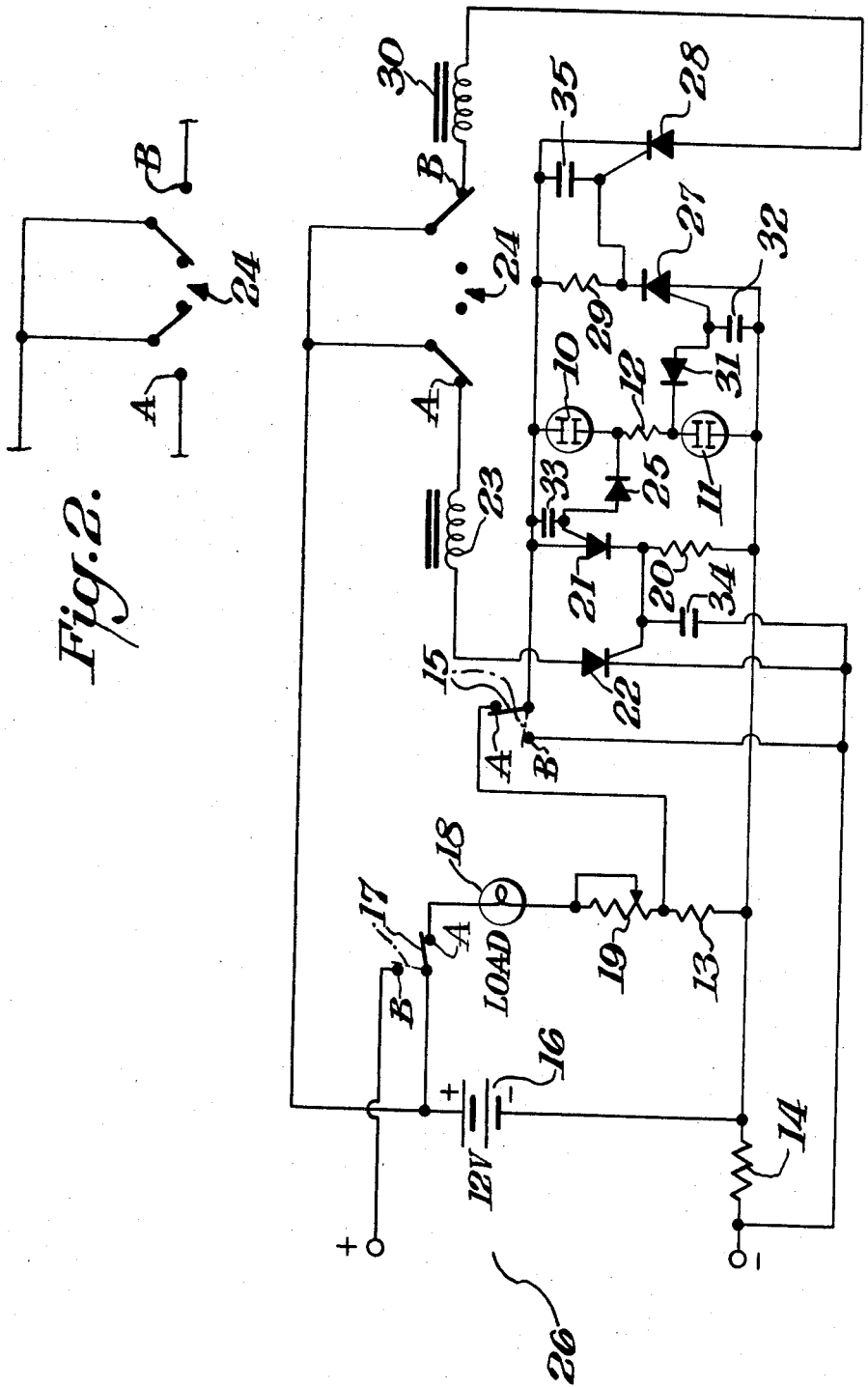
FIG. 1 is a schematic of the monitoring and control means of this invention.
FIG. 2 is a schematic of the switch means of FIG. 1 in a disconnected position.

The coulometer is an electrochemical cell having a pair of reversible electrodes and substantially the same electrode potential. The cell contains electrolyte in contact with the electrodes and it develops an abrupt change in voltage between the electrodes when the electrolytic process reaches a point when more than a definite net amount of charge has passed through the cell. The construction and operation of a suitable coulometer is disclosed in U.S. Pat. No. 3,564,347.

The coulomb is the standard reference unit in the specification of coulometers and it refers to the passage of 1 ampere of current for 1 second. It is thus a measurement of electrical current through the cell with one of the metal electrodes being plated with a layer of metal of the other electrode. The plated layer will dissolve in the electrolyte when electric current is passed through the cell in the appropriate direction. The dissolving of the plated layer is a function of the amount of current flowing and continues until the plating is completely removed from the base electrode. This is known as deplating. At this time the electrolytic cell will consist of two dissimilar electrodes and consequently a voltage will be suddenly developed across the two electrodes. This change is from essentially no voltage during the deplating process. As the period of time and the amount of current passing during the deplating directly reflects the coulombs, the number of coulombs either supplied by the battery charging or by the use of the battery are equally reflected in the removal of the plated layer. They are thus directly related to the onset of the voltage rise.

Further the amount of deplating which takes place within the cell is proportional to the ampere-hours either drained from or charged on the battery. The passage of a quantity of electricity through the cell in one direction during one mode is equal to the quantity of electricity passed through the cell in the opposite direction during the other mode. The coulometer is constructed with a known ampere-hour capacity and the control circuit is designed so that the increased potential difference which leads to the impedance transformation will occur at a desired condition of the battery. Stated otherwise, the coulometers when properly selected with relation to the battery act as indicators of the state of charge on the battery in that the voltage rise signals the amount of charge current that has been removed from or returned to the battery.

A control and monitoring system according to this invention is illustrated by the schematic diagram of FIG. 1. A pair of coulometers 10 and 11 are connected in series with a current limiting resistor 12 connected between the coulometers 10 and 11 and in series therewith. The coulometer branch is connected on one side to the intermediate point between two current sensing resistors 13 and 14 and on the other side to a switch 15 having contacts A and B. A battery 16 on its positive side is connected to a switch 17, having contacts A and B. Through contact 17A the battery is connected to a load 18 and through a variable resistor 19 to switch contact 15A. In the load-connected condition the battery circuit is completed through current sensing resistor 13.

The negative side of battery 16 is connected to the intermediate point between resistors 13 and 14, to coulometer 11 and to a resistor 20. The resistor 20 is connected to the cathode of controlled rectifier 21 and to the gate of controlled rectifier 22.

During the drain mode illustrated in FIG. 1 both rectifiers 21 and 22 are in a blocked, non-conducting state. In the normal, drain, mode the switch 15 is closed on contact 15A, so that the anode of rectifier 21 and coulometer 10 are connected to the positive side of current sensing resistor 13. The anode of controlled rectifier 22 is connected to the positive side of battery 16 through relay 23 and switch 24, which has contacts A and B, but in the blocked condition of rectifier 22 during the drain mode, no current flows through the relay 23.

The coulometer 10 is the drain coulometer and is in a series circuit with the battery 16 and in parallel with current sensing resistor 13. The current through coulometer 10 is limited by the resistor 12, and while battery 16 is connected to load 18 the coulometer current, which is proportional to the battery current, deplates the coulometer 10. Thus as the battery current drains, the coulometer current deplates the coulometer 10. During the drain phase the voltage across coulometer 10 remains at a low level. At the desired critical deplating, the coulometer 10 will become deplated, the resistance within the cell and consequent voltage rises sharply. This occurs when the number of coulombs supplied by battery 16 to load 18 has reached a critical depletion level and the battery needs to be recharged.

The voltage rise in the coulometer 10 places a new potential directly across the controlled rectifier 21 through the voltage rise applied to the gate of rectifier 21 by the connection from coulometer 10 through diode 25. A voltage is applied to rectifier 21 sufficient to cause conduction through rectifier 21 and consequently through resistor 20. The voltage developed across resistor 20 is applied to the gate of controlled rectifier 22 causing it to conduct and pass current through relay 23 to energize it and throw switches 15 and 17 from their respective contacts A to their contacts B, as shown by phantom lines in FIG. 1.

This moves load 18 from battery 16 and connects the battery 16 to a source 26 of charging current.

While the battery 16 is charging, the coulometer circuit appears in parallel with sensing resistor 14, reversing the potential on coulometers 10 and 11 and a proportional amount of charge is being removed from coulometer 11 and being deposited in coulometer 10.

A controlled rectifier 27 and a controlled rectifier 28 are not conducting during the charging phase. When a critical amount of charge has been removed from the coulometer 11 it will undergo an impedance transformation the same as described above for coulometer 10 with an accompanying voltage rise. The voltage rise is applied to the gate electrode of controlled rectifier 27 to provide sufficient voltage amplitude to break the rectifier 27 into conduction in a forward direction. The resultant current conduction through it and the resistor 29, provides a positive potential on the gate of controlled rectifier 28 to cause it to conduct. The resultant current flow energizes a relay 30 and with the consequent actuation of the switch 24, the switch 24 is moved to the positions shown in FIG. 2. Thus anode circuits are broken and relays 23 and 30 are deenergized, releasing switches 17, 15 and 24 so that they return to the normal positions shown in full lines in FIG. 1 with the concommitant disconnection of the battery 16 from the charger 26, and reconnection of the battery 16 to the load 18. The cycle is started again.

The voltage rise in coulometer is applied to the gate of rectifier 27 by the connection from coulometer 11 through diode 31. The diodes 25 and 31 are provided to isolate the series circuit of coulometer 10, resistor 12 and coulometer 11. Capacitors 32, 33, 34 and 35 bypass capacitors which eliminate stray voltages from triggering the rectifiers.

For the purpose of illustration only, the following is a representative example. Among typical load currents for nickel-cadmium batteries is 10 ampere-hour. This is before critical depletion. Thus an operating load of 1 ampere would draw in 10 hours, 10 ampere-hour charge. The sensing resistors then typically have a 1 volt drop across a 1 ohm resistance. Assuming a typical coulometer operating at 10 $\mu$ a., the series resistor 12 is 100 kilohms. Typical operation of each coulometer at 10 $\mu$ a. for 10 hours would give 100 micro-ampere-hour charge. This is the amount of charge in the coulometer at the beginning of deplating.

Among other advantages of this invention is the ability to return to the battery the correct number of coulombs. If the sensing resistors 13 and 14 are the same, the current X time product for the two will be the same. If the current is increased the time is proportionally decreased to result in the same amount of charge in the coulometers. Thus during charge mode the deplating can occur faster than during the drain mode. Further, if the battery is only 90 percent efficient then 10 percent more ampere-hour charge can be returned, in each cycle, than is removed. So the sensing resistor 14 can be 10 percent lower than the sensing resistor 13 with the result that the charge is run 10 percent longer.

The present system is simple in construction and involves an insignificant use of current.

It is also noted as an advantage that the supply voltage is used to hold the switches during the charge mode.

Further, the very small power requirements make this system readily adaptable to field or portable use.

What is claimed is:

1. A battery operating system timed by coulometers, said system comprising a battery, a load, a charging source, switching means to alternatively connect said battery to said load and said source, a pair of current integrators in the form of a first coulometer to integrate a proportional drain current and a second coulometer to integrate a proportional charge current, said first coulometer and said second coulometer operatively connected in a circuit with said switching means such that a charge being drained from said battery by said load causes said first coulometer to deplate and said second coulometer to plate until an impedance transformation in said first coulometer causes said switching means to connect said battery to said source whereupon a charge from said source to said battery causes said second coulometer to deplate and said first coulometer to plate until an impedance transformation in said second coulometer causes said switching means to connect said battery to said load.

2. In a rechargeable battery control system having a pair of coulometers connected in series so that each coulometer deplates as the other coulometer plates and a source of current for recharging a battery, a battery, a first switching means being operable to connect the battery with a battery load, and a first sensing resistor connected in series with said battery and connectible to said battery load, means connecting said pair of coulometers in parallel with said first sensing resistor during the discharge of said battery including a second switching means having a first contact connectible to said first sensing resistor, whereby closing said first contacts of said first and second switching means and connecting said battery to a load produces an abrupt impedance transformation in one of said coulometers upon passage of a predetermined charge current through the coulometer, said coulometer being connected to gating means to actuate by said abrupt impedance transformation means for switching said first and second switching means to open the respective first contacts and close respective second contacts, the second contact of the first switching means being operable to connect the battery to one terminal of the current source, a second sensing resistor connected in series with the battery and the other terminal of the current source, the second contact of the second switching means being operable to connect the second sensing resistor in parallel with the pair of coulometers whereby the passage of a predetermined charge current through the other of the coulometers produces an impedance transformation, gating means connected to said other coulometer for actuating by said impedance transformation means for switching said first and second switching means to open said respective second contacts and reclose the first contacts.

3. In the system as claimed in claim 2, means joining the sensing resistors and means connecting the junction of the sensing resistors with the coulometers.

4. The system as claimed in claim 3 in which the interconnection of the coulometers at the junction is the negative side of the first sensing resistor during the battery discharge and the positive side of the second sensing resistor during the battery charge.

5. In the system as claimed in claim 2, said first and second sensing resistors having the same values.

6. In the system as claimed in claim 2, a first sensing resistor having a higher value than the second sensing resistor so that a greater ampere-hour charge is provided through the second resistor.

7. In the system as claimed in claim 2, means connecting the first and second switching means with the current source to hold the second contacts closed by the voltage of the current source.

* * * * *